US006929789B2

(12) United States Patent
Zones et al.

(10) Patent No.: US 6,929,789 B2
(45) Date of Patent: Aug. 16, 2005

(54) ZEOLITE SSZ-61 COMPOSITION OF MATTER AND SYNTHESIS THEREOF

(75) Inventors: Stacey Zones, San Francisco, CA (US); Saleh Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 147 days.

(21) Appl. No.: 10/652,436

(22) Filed: Aug. 28, 2003

(65) Prior Publication Data

US 2005/0049139 A1 Mar. 3, 2005

(51) Int. Cl.$^7$ .............................................. C01B 39/48
(52) U.S. Cl. ..................... 423/718; 423/706; 423/335

(58) Field of Search ................................. 423/706, 718, 423/335

(56) References Cited

U.S. PATENT DOCUMENTS 5,785,947 A * 7/1998 Zones et al. ................. 423/705
5,800,801 A * 9/1998 Tejada et al. ................ 423/705

* cited by examiner

Primary Examiner—David Sample
(74) Attorney, Agent, or Firm—Richard J. Sheridan

(57) ABSTRACT

The present invention relates to new crystalline molecular sieve SSZ-61 prepared using tetracyclic azonia cations as structure-directing agents, and methods for synthesizing SSZ-61.

25 Claims, No Drawings

ZEOLITE SSZ-61 COMPOSITION OF MATTER AND SYNTHESIS THEREOF

BACKGROUND OF THE INVENTION

1. Field of the Invention

The present invention relates to new crystalline molecular sieve SSZ-61, a method for preparing SSZ-61 using a family of tetracyclic azonia cations as a structure directing agent and the use of SSZ-61 as an adsorbent.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "molecular sieve SSZ-61" or simply "SSZ-61". Preferably, SSZ-61 is obtained in its silicate, aluminosilicate, titanosilicate, germanosilicate, vanadosilicate, ferrosilicate or borosilicate form. The term "silicate" refers to a molecular sieve having a high mole ratio of silicon oxide relative to aluminum oxide, preferably a mole ratio greater than 100, including molecular sieves comprised entirely of silicon oxide. As used herein, the term "aluminosilicate" refers to a molecular sieve containing both aluminum oxide and silicon oxide and the term "borosilicate" refers to a molecular sieve containing oxides of both boron and silicon.

In accordance with this invention, there is provided a molecular sieve having a mole ratio greater than about 15 of (1) an oxide of a first tetravalent element to (2) an oxide of a trivalent element, pentavalent element, second tetravalent element different from said first tetravalent element or mixture thereof and having, after calcination, the X-ray diffraction lines of Table I.

Further, in accordance with this invention, there is provided a molecular sieve having a mole ratio greater than about 15 of (1) an oxide selected from silicon oxide, germanium oxide and mixtures thereof to (2) an oxide selected from aluminum oxide, gallium oxide, iron oxide, boron oxide, titanium oxide, indium oxide, vanadium oxide and mixtures thereof and having, after calcination, the X-ray diffraction lines of Table I below. It should be noted that the mole ratio of the first oxide or mixture of first oxides to the second oxide can be infinity, i.e., there is no second oxide in the molecular sieve. In these cases, the molecular sieve is an all-silica molecular sieve or a germanosilicate.

The present invention further provides such a molecular sieve having a composition, as synthesized and in the anhydrous state, in terms of mole ratios as follows:

| | |
|---|---|
| $YO_2/W_cO_d$ | 15–∞ |
| $M_{2/n}/YO_2$ | 0–0.03 |
| $Q/YO_2$ | 0.02–0.08 |
| $F/YO_2$ | 0–0.10 | wherein Y is silicon, germanium or a mixture thereof; W is aluminum, gallium, iron, boron, titanium, indium, vanadium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof; n is the valence of M (i.e., 1 or 2); and Q is a tetracyclic azonia cation.

Also provided in accordance with the present invention is a method of preparing a crystalline material comprising (1) an oxide of a first tetravalent element and (2) an oxide of a trivalent element, pentavalent element, second tetravalent element which is different from said first tetravalent element, or mixture thereof and having a mole ratio of the first oxide to the second oxide greater than 15, said method comprising contacting under crystallization conditions sources of said oxides and a structure directing agent comprising a tetracyclic azonia cation.

DETAILED DESCRIPTION OF THE INVENTION

The present invention comprises a family of crystalline, large pore molecular sieves designated herein "molecular sieve SSZ-61" or simply "SSZ-61". As used herein, the term "large pore" means having an average pore size diameter greater than about 6.0 Angstroms, preferably from about 6.5 Angstroms to about 7.5 Angstroms or larger.

In preparing SSZ-61, a tetracyclic azonia cation is used as a structure directing agent ("SDA"), also known as a crystallization template. The SDA's useful for making SSZ-61 have the following structures:

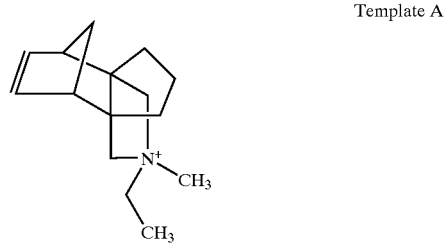

Template A 8-azonia-8-ethyl-8-methyltetracyclo[$4.3.3.1^{2,5}.0^{1,6}$]tridec-3-ene

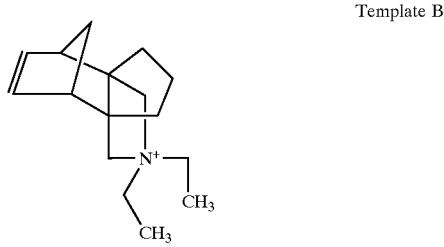

Template B 8-azonia-8,8-diethyltetracyclo[4.3.3.1$^{2,5}$.0$^{1,6}$]tridec-3-ene Template C

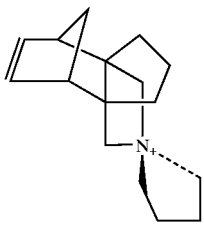

1-azoniapentacyclo[8.-1.4.3$^{3,8}$.1$^{4,7}$.0$^{3,8}$]heptadec-5-ene

Template D

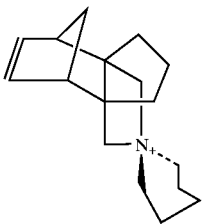

1-azoniapentacyclo[8.-1.5.3$^{3,8}$.1$^{4,7}$.0$^{3,8}$]octadec-5-ene

Template E

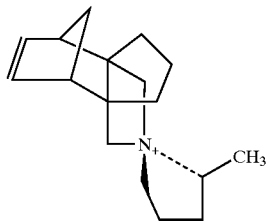

1-azonia-13-methylpentacyclo[8.-1.4.3$^{3,8}$.1$^{4,7}$.0$^{3,8}$]heptadec-5-ene The SDA cation is associated with an anion (X$^-$) which may be any anion that is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

In general, SSZ-61 is prepared by contacting an active source of one or more oxides selected from the group consisting of monovalent element oxides, divalent element oxides, trivalent element oxides, tetravalent element oxides and/or pentavalent elements with the tetracyclic azonia cation SDA.

SSZ-61 is prepared from a reaction mixture having the composition shown in Table A below.

TABLE A

| | Reaction Mixture | |
|---|---|---|
| | Typical | Preferred |
| YO$_2$/W$_a$O$_b$ | >15 | ~100–∞ |
| OH—/YO$_2$ | 0.20–0.80 | 0.40–0.60 |
| Q/YO$_2$ | 0.20–0.80 | 0.40–0.60 |
| M$_{2/n}$/YO$_2$ | 0–0.40 | 0–0.25 |

TABLE A-continued

| | Reaction Mixture | |
|---|---|---|
| | Typical | Preferred |
| H$_2$O/YO$_2$ | 10–80 | ~15–25 |
| HF/YO$_2$ | 0.20–0.80 | 0.30–0.60 | where Y, W, Q, M and n are as defined above, and a is 1 or 2, and b is 2 when a is 1 (i.e., W is tetravalent) and b is 3 when a is 2 (i.e., W is trivalent).

In practice, SSZ-61 is prepared by a process comprising:

(a) preparing an aqueous solution containing sources of at least one oxide capable of forming a crystalline molecular sieve and a tetracyclic azonia cation capable of forming SSZ-61 having an anionic counterion which is not detrimental to the formation of SSZ-61;

(b) maintaining the aqueous solution under conditions sufficient to form crystals of SSZ-61; and (c) recovering the crystals of SSZ-61.

Accordingly, SSZ-61 may comprise the crystalline material and the SDA in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a trivalent element(s), pentavalent element(s), second tetravalent element(s) different from the first tetravalent element(s) or mixture thereof. The first tetravalent element(s) is preferably selected from the group consisting of silicon, germanium and combinations thereof. More preferably, the first tetravalent element is silicon. The trivalent element, pentavalent element and second tetravalent element (which is different from the first tetravalent element) is preferably selected from the group consisting of aluminum, gallium, iron, boron, titanium, indium, vanadium and combinations thereof. More preferably, the second trivalent or tetravalent element is aluminum or boron.

Typical sources of aluminum oxide for the reaction mixture include aluminates, alumina, aluminum colloids, aluminum oxide coated on silica sol, hydrated alumina gels such as Al(OH)$_3$ and aluminum compounds such as Al(NO$_3$)$_3$, AlCl3 and Al$_2$(SO$_4$)$_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, indium, vanadium and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The SDA may be used to provide hydroxide ion. Thus, it may be beneficial to ion exchange, for example, the halide to hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-61 are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the molecular sieve is prepared using mild stirring or agitation.

During the hydrothermal crystallization step, the SSZ-61 crystals can be allowed to nucleate spontaneously from the reaction mixture. The use of SSZ-61 crystals as seed material can be advantageous in decreasing the time necessary for complete crystallization to occur. In addition, seeding can lead to an increased purity of the product obtained by promoting the nucleation and/or formation of SSZ-61 over any undesired phases. When used as seeds, SSZ-61 crystals are added in an amount between 0.1 and 10% of the weight of first tetravalent element oxide, e.g. silica, used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-61 crystals. The drying step can be performed at atmospheric pressure or under vacuum.

SSZ-61 as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 15; and has, after calcination, the X-ray diffraction lines of Table I below. SSZ-61 further has a composition, as synthesized (i.e., prior to removal of the SDA from the SSZ-61) and in the anhydrous state, in terms of mole ratios, shown in Table B below.

TABLE B

| As-Synthesized SSZ-61 | |
|---|---|
| $YO_2/W_cO_d$ | 15–∞ |
| $M_{2/n}/YO_2$ | 0–0.03 |
| $Q/YO_2$ | 0.02–0.08 |
| $F/YO_2$ | 0–0.10 | where Y, W, c, d, M, n and Q are as defined above.

SSZ-61 can be made with a mole ratio of $YO_2/W_cO_d$ of ∞, i.e., there is essentially no $W_cO_d$ present in the SSZ-61. In this case, the SSZ-61 would be an all-silica material or a germanosilicate. Thus, in a typical case where oxides of silicon and, optionally, germanium are used, SSZ-61 can be made essentially aluminum free, i.e., having a silica to alumina mole ratio of ∞. A method of increasing the mole ratio of silica to alumina is by using standard acid leaching or chelating treatments. However, essentially aluminum-free SSZ-61 can be synthesized using essentially aluminum-free silicon sources as the main tetrahedral metal oxide component, if boron is also present. The boron can then be removed, if desired, by treating the borosilicate SSZ-61 with acetic acid at elevated temperature (as described in Jones et al., *Chem. Mater.*, 2001, 13, 1041–1050) to produce an all-silica version of SSZ-61. SSZ-61 can also be prepared directly as a borosilicate. If desired, the boron can be removed as described above and replaced with metal atoms by techniques known in the art.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that SSZ-61 is comprised of a new framework structure or topology which is characterized by its X-ray diffraction pattern. SSZ-61, after calcination, has a crystalline structure whose X-ray powder diffraction pattern exhibit the characteristic lines shown in Table I and is thereby distinguished from other molecular sieves.

TABLE I

| Calcined SSZ-61 | | |
|---|---|---|
| 2 Theta[a] | d-spacing (Angstroms) | Relative Intensity (%)[b] |
| 4.48 | 19.7 | S |
| 7.24 | 12.2 | VS |
| 9.23 | 9.6 | W |
| 10.08 | 8.8 | W–M |
| 13.94 | 6.4 | W |
| 17.90 | 4.96 | W |
| 20.68 | 4.30 | VS |
| 21.70 | 4.10 | W |
| 23.37 | 3.80 | W |
| 25.40 | 3.51 | W–M |
| 35.48 | 2.53 | W |

[a] ±0.1
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

Table IA below shows the X-ray powder diffraction lines for calcined SSZ-61 including actual relative intensities.

TABLE IA

| Calcined SSZ-61 | | |
|---|---|---|
| 2 Theta[a] | d-spacing (Angstroms) | Relative Intensity (%) |
| 4.48 | 19.7 | 47 |
| 7.24 | 12.2 | 100 |
| 9.23 | 9.6 | 13 |
| 10.08 | 8.8 | 21 |
| 13.94 | 6.4 | 7 |
| 17.90 | 4.96 | 11 |
| 18.28 | 4.85 | 12 |
| 18.68 | 4.75 | 7 |
| 19.72 | 4.5 | 12 |
| 20.68 | 4.30 | 84 |
| 21.70 | 4.10 | 18 |
| 23.37 | 3.80 | 12 |
| 24.13 | 3.69 | 6 |
| 25.40 | 3.51 | 19 |
| 25.62 | 3.48 | 17 |
| 26.64 | 3.35 | 17 |
| 35.48 | 2.53 | 10 |

[a] ±0.1

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.1 degrees.

Representative peaks from the X-ray diffraction pattern of calcined SSZ-61 are shown in Table I. Calcination can result in changes in the intensities of the peaks as compared to patterns of the "as-made" material, as well as minor shifts in the diffraction pattern. The molecular sieve produced by exchanging the metal or other cations present in the molecular sieve with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-61 can be used as-synthesized, but preferably will be thermally treated (calcined). Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

Metals may be introduced into the molecular sieve by replacing some of the cations in the molecular sieve with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-61. The SSZ-61 can also be impregnated with the metals, or the metals can be physically and intimately admixed with the SSZ-61 using standard methods known to the art.

Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the molecular sieve is typically washed with water and dried at temperatures ranging from 65° C. to about 200° C. After washing, the molecular sieve can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-61, the spatial arrangement of the atoms which form the basic crystal lattice of the molecular sieve remains essentially unchanged.

SSZ-61 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-61 can be extruded before drying, or, dried or partially dried and then extruded.

SSZ-61 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-61 is useful as an adsorbent.

EXAMPLES

The following examples demonstrate but do not limit the present invention.

Example 1

Synthesis of Template B

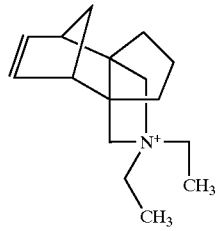

Template B 8-azonia-8,8-diethyltetracyclo[4.3.3.1$^{2,5}$.0$^{1,6}$]tridec-3-ene An anion ($X^-$) is associated with the cation and may be any anion which is not detrimental to the formation of SSZ-61. Representative anions include halogen, e.g., fluoride, chloride, bromide and iodide, hydroxide, acetate, sulfate, tetrafluoroborate, carboxylate, and the like. Hydroxide is the most preferred anion.

The structure-directing agent (SDA) 8-azonia-8,8-diethyltetracyclo[4.3.3.1$^{2,5}$.0$^{1,6}$]tridec-3-ene cation is synthesized according to the procedure described below. To a solution of freshly cracked cyclopentadiene (40 grams) in 1200 ml of dichloromethane is added 1-cyclopentene-1,2-dicarboxylic acid anhydride (30 grams). The reaction is stirred at room temperature for several days. The desired product, 8-oxa-tetracyclo[4.3.3.1$^{2,5}$.0$^{1,6}$]tridec-3-ene-7,9-dione, is isolated by recrystallization (after stripping off solvent) from 2/1 ethyl ether, dichloromethane with refrigeration.

Next the product is reacted with a primary amine in water at 85° C. for 3 days in a closed system. For example, 4.5 grams of the tetracyclic anhydride is placed in the Teflon cup of a 125 cc Parr reactor with 10 ml of ethylamine (70% in $H_2O$) and 0.30 grams of 4-dimethylaminopyridine as catalyst. After heating for three days, the reaction is cooled, and upon gentle agitation the desired imide precipitates. The precipitate is collected by filtration and dried under vacuum. Reduction of the Precursor Imide to the Corresponding Amine.

To a suspension of lithium aluminum hydride (2.52.) in tetrahydrofuran (55 mL) at 0° C. (by means of an ice-bath) in a 250 ml three-necked flask, the imide (5 gm) dissolved in 40 ml THF is added drop-wise (via an addition funnel) with mechanical stirring. Once the imide is all added, the ice-bath is replaced with a heating mantle, and the reaction mixture is heated to reflux overnight. The heating mantle is replaced with an ice-bath and the reaction mixture is diluted with 50 mL diethyl ether. The reaction is worked up by adding 15 ml of 15% NaOH solution drop-wise under vigorous stirring. Once the addition of the NaOH solution is completed, the gray reaction mixture turned to a colorless liquid with a white precipitate. The mixture is filtered and the filtrate is dried over $MgSO_4$. Filtration and concentration of the filtrate at reduced pressure on a rotary evaporator gives 4.12 gm of the desired amine.

Quaternization with Ethyl Iodide (Synthesis of the 8-azonia-8,8-diethyltetracyclo[$4.3.3.1^{2,5}.0^{1,6}$]tridec-3-ene Iodide, Template B)

To a solution of 5 gm of 8-aza-8-ethyltetracyclo[$4.3.3.1^{2,5}.0^{1,6}$]tridec-3-ene in 60 ml anhydrous methanol, 9.4 gm of ethyl iodide is added. The reaction is mechanically stirred for 48 hours at room temperature. Then, an additional equivalent of ethyl iodide (4.7 gm) is added and the reaction is further stirred at room temperature for an additional 48 hours. The reaction mixture is concentrated under reduced pressure on a rotary evaporator to give the iodide salt as an off-white-colored solid material. This iodide salt is purified by recrystallization. This is done by completely dissolving the iodide salt in acetone and then precipitating by the addition of ethyl ether to the acetone solution. The procedure gives a white powder with very clean $^1H$ and $^{13}C$ NMR spectra, and correct elemental analysis for the product.

Ion Exchange

8-Azonia-8,8-diethyltetracyclo[$4.3.3.1^{2,5}.0^{1,6}$]tridec-3-ene iodide (4.10 gm) is dissolved in 12 ml water in a 100-ml volume plastic bottle. To the solution, 8.4 gm of Ion-Exchange Resin-OH (Bio Rad® AG1-X8) is added and the mixture is stirred at room temperature overnight. The product is collected by filtration removal of the resin after 3–4 days of exchange. A sample of the solution is titrated to determine the OH molarity for subsequent use in zeolite synthesis.

Examples 2–5

Synthesis of Templates A, C, D and E

Template A is synthesized by quaternization of 8-aza-8-ethyltetracyclo[$4.3.3.1^{2,5}.0^{1,6}$]tridec-3-ene with methyl iodide. Templates C–E are all made using the methodology described above. The parent imide, 8-aza-tetracyclo[$4.3.3.1^{2,5}.0^{1,6}$]tridec-3-ene-7,9-dione, is synthesized by reacting the tetracyclic anhydride with ammonia, which upon $LiAlH_4$-reduction yields the unsubstituted secondary cyclic amine, 8-aza-tetracyclo[$4.3.3.1^{2,5}.0^{1,6}$]tridec-3-ene. Quaternization of this amine with the appropriate dihalide in the presence of $KHCO_3$ yields the desired template (Template C from 1,4-diiodobutane, Template D from 1,5-diiodobutane, and Template E from 2-methyl-1,4-diiodobutane). It is to be anticipated that other derivatives can be prepared by the choice of the imide forming reagent coupled with choices for the alkylation step.

Example 6

Representative Synthesis of SSZ-61

A 23 cc Teflon liner (tared) is charged with a solution of 8-azaonia-8,8-diethyltetracyclo[$4.3.3.1^{2,5}.0^{1,6}$]tridec-3-ene hydroxide (4 mmol Template B), and 1.66 grams of tetraethyl orthosilicate (8mM of SiO2). This material is placed in a hood and allowed to evaporate (ethanol) for several days and then the $H_2O/SiO_2$ ratio is adjusted to 20. 0.148 Grams of 50% HF is added with stirring using a plastic spatula. The resulting gel is capped off and placed in a Parr steel autoclave reactor and heated in an oven at 150° C. while rotating at 43 rpm. The reaction is monitored by checking the gel's pH, and by looking for crystal formation using Scanning Electron Microscopy (SEM) at six day intervals. The reaction is completed after heating for 18 days at the conditions described above. Once the crystallization is complete, the mixture is filtered through a fritted-glass funnel. The collected solids are thoroughly washed with water and then rinsed with acetone (~20 ml) to remove any organic residues. The solids are allowed to air-dry over night and then dried in an oven at 120° C. for one hour. The reaction afforded 0.38 gram of SSZ-61. X-ray and IR analysis of the powder indicated the product to be SSZ-61.

Example 7

Calcination of SSZ-61

The material from Example 6 is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for five hours, after which it is increased to 594° C. and held there for another five hours. A 50/50 mixture of air and nitrogen is passed over the SSZ-61 at a rate of 20 standard cubic feet (0.57 standard cubic meters) per minute during heating.

Example 8

Synthesis of SSZ-61

SSZ-61 is synthesized as described in Example 6 using SDA B.

Example 9

Synthesis of SSZ-61

SSZ-61 is synthesized as described in Example 6 using SDA C.

Example 10

Synthesis of SSZ-61

SSZ-61 is synthesized as described in Example 6 using SDA D.

Example 11

Synthesis of SSZ-61

SSZ-61 is synthesized as described in Example 6 except that the reaction is conducted at 170° C.

Example 12

Synthesis of SSZ-61

SSZ-61 is synthesized as described in Example 10 except that the reaction is conducted at 170° C.

Example 13

Synthesis of SSZ-61

SSZ-61 is synthesized as described in Example 6 except that the $SiO_2/Al_2O_3$ mole ratio is 150 and $Al(NO_3)_3$ is used as the source of aluminum.

Example 14

Argon Adsorption Analysis

SSZ-61 has a micropore volume of at least 0.06 cc/gm based on argon adsorption isotherm at 87.3° K. (−186° C.) recorded on ASAP 2010 equipment from Micromerities. The low-pressure dose was 2.00 cm³/g (STP) with 15-s equilibration interval. The argon adsorption isotherm was analyzed using the density function theory (DFT) formalism and parameters developed for activated carbon slits by Olivier (*Porous Mater.* 1995, 2, 9) using the Saito Foley adaptation of the Horvarth-Kawazoe formalism (*Microporous Materials*, 1995, 3, 531) and the conventional t-plot method (*J. Catalysis*, 1965, 4, 319). The analysis indicated a large pore molecular sieve.

Example 15

1,3,5-Triisopropylbenzene Adsorption

The adsorption capacity of SSZ-61 for vapor phase hydrocarbons is measured at room temperature using a Cahn C-2000 balance coupled with a computer via an ATI-Cahn digital interface. 1,3,5-Triisopropylbenzene is used as a "plug gauge" adsorbate molecule. The 1,3,5-triisopropylbenzene (liquid) is 99.5+% pure as determined with GC analysis and used as supplied by the manufacturer (Aldrich). The vapor of the adsorbate is delivered from the liquid phase. The relative vapor pressure P/Po is maintained at ~0.3 by controlling the temperature of the liquid adsorbate using a cooling circulator. Prior to the adsorption experiments, the calcined SSZ-61 is degassed at 350° C. in a vacuum of at least $10^{-3}$ Torr for 5 hours. The adsorption capacity is reported in milliliters of liquid per gram of dry SSZ-61, assuming bulk liquid density for the adsorbate adsorbed in the sample pores. Data for 1,3,5-triisopropylbenzene adsorption is collected after 5 days.

SSZ-61 has an adsorption capacity for 1,3,5-triisopropylbenzene of 0.079 ml/g for the product of Example 7. This value places SSZ-61 in the group of zeolites that are usually larger than 12 ring (certainly for the high silica, one dimensional systems).

What is claimed is:

1. A molecular sieve having a mole ratio greater than about 15 of an oxide of a first tetravalent element to an oxide of a second tetravalent element which is different from said first tetravalent element, trivalent element, pentavalent element or mixture thereof and having, after calcination, the X-ray diffraction lines of Table I.

2. A molecular sieve having a mole ratio greater than about 15 of an oxide selected from the group consisting of silicon oxide, germanium oxide and mixtures thereof to an oxide selected from aluminum oxide, gallium oxide, iron oxide, boron oxide, titanium oxide, indium oxide, vanadium oxide and mixtures thereof, and having, after calcination, the X-ray diffraction lines of Table I.

3. A molecular sieve according to claim 2 wherein the oxides comprise silicon oxide and aluminum oxide.

4. A molecular sieve according to claim 2 wherein the oxides comprise silicon oxide and boron oxide.

5. A molecular sieve according to claim 1 wherein said molecular sieve is predominantly in the hydrogen form.

6. A molecular sieve according to claim 1 wherein said molecular sieve is substantially free of acidity.

7. A molecular sieve having a composition, as synthesized and in the anhydrous state, in terms of mole ratios as follows:

| | |
|---|---|
| $YO_2/W_cO_d$ | 15–∞ |
| $M_{2/n}/YO_2$ | 0–0.03 |
| $Q/YO_2$ | 0.02–0.08 |
| $F/YO_2$ | 0–0.10 | wherein Y is silicon, germanium or a mixture thereof; W is aluminum, gallium, iron, boron, titanium, indium, vanadium or mixtures thereof; c is 1 or 2; d is 2 when c is 1 or d is 3 or 5 when c is 2; M is an alkali metal cation, alkaline earth metal cation or mixtures thereof; n is the valence of M; and Q is a cation selected from the group consisting of the following:

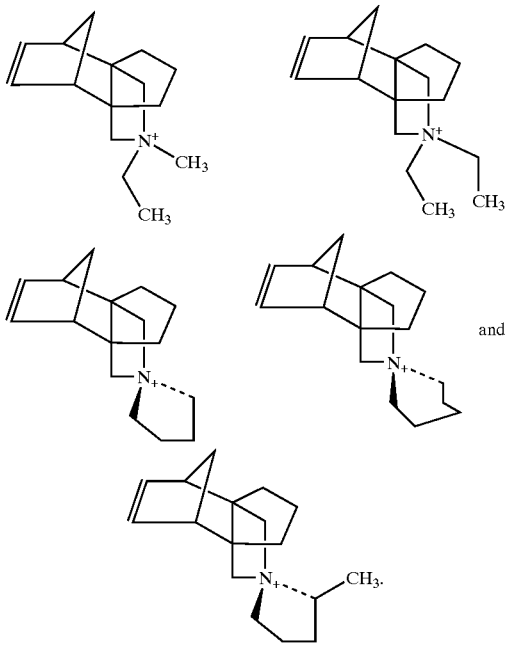

8. A molecular sieve according to claim 7 wherein W is aluminum and Y is silicon.

9. A molecular sieve according to claim 7 wherein W is boron and Y is silicon.

10. A molecular sieve according to claim 7 wherein Q is

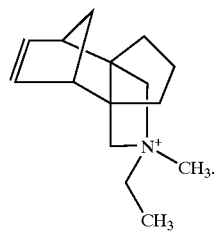

11. A molecular sieve according to claim 7 wherein Q is

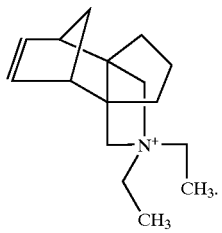

12. A molecular sieve according to claim 7 wherein Q is

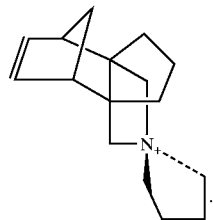

13. A molecular sieve according to claim 7 wherein Q is

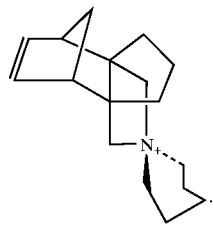

14. A molecular sieve according to claim 7 wherein Q is

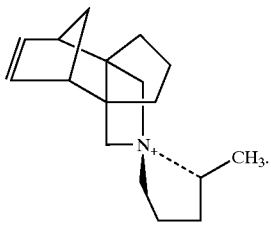

15. A method of preparing a crystalline material comprising (1) an oxide of a first tetravalent element and (2) an oxide of a trivalent element, pentavalent element, second tetravalent element which is different from said first tetravalent element or mixture thereof, said method comprising contacting under crystallization conditions sources of said oxides and a structure directing agent comprising a cation selected from the group consisting of the following:

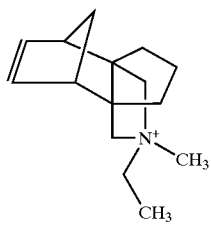 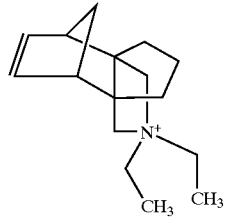

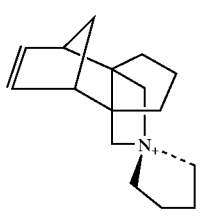 and

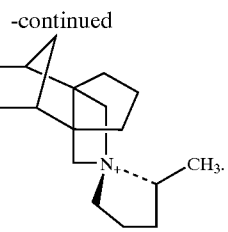

16. The method according to claim 15 wherein the first tetravalent element is selected from the group consisting of silicon, germanium and combinations thereof.

17. The method according to claim 15 wherein the second trivalent element, pentavalent element or tetravalent element is selected from the group consisting of aluminum, gallium, iron, boron, titanium, indium, vanadium and combinations thereof.

18. The method according to claim 17 wherein the second trivalent element or tetravalent element is selected from the group consisting of aluminum, boron, titanium and combinations thereof.

19. The method according to claim 16 wherein the first tetravalent element is silicon.

20. The method of claim 15 wherein the structure directing agent is

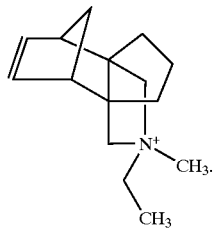

21. The method of claim 15 wherein the structure directing agent is

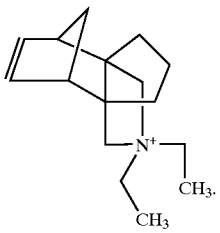

22. The method of claim 15 wherein the structure directing agent is

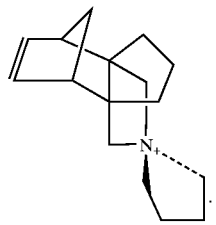

23. The method of claim 15 wherein the structure directing agent is
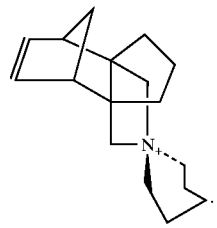
24. The method of claim 15 wherein the structure directing agent is
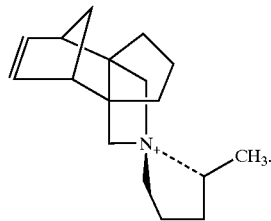
25. The method of claim 15 wherein the crystalline material has, after calcination, the X-ray diffraction lines of Table I.
* * * * *